Oct. 16, 1962 H. O. MOORE 3,058,117
PUNCH POWER CONTROL APPARATUS
Filed May 23, 1961 5 Sheets-Sheet 1

INVENTOR:
HARRY O. MOORE

BY Eaton, Bell, Hunt & Seltzer
ATTORNEYS

Oct. 16, 1962 H. O. MOORE 3,058,117
PUNCH POWER CONTROL APPARATUS
Filed May 23, 1961 5 Sheets-Sheet 2

Fig-3

INVENTOR:
HARRY O. MOORE

By Eaton, Bell,
Hunt + Seltzer
ATTORNEYS

INVENTOR:
HARRY O. MOORE

BY Eaton, Bell, Hunt & Seltzer
ATTORNEYS

United States Patent Office 3,058,117
Patented Oct. 16, 1962

3,058,117
PUNCH POWER CONTROL APPARATUS
Harry O. Moore, Charlotte, N.C., assignor of fifty percent to Frank E. Godley, Charlotte, N.C.
Filed May 23, 1961, Ser. No. 111,944
15 Claims. (Cl. 1—106)

The present invention relates to punch-type implements and more particularly to a novel apparatus for applying force to such implements including adjustable control means for rendering the force applying means inoperative upon the application of a predetermined amount of force to the punch-type implement.

In punch-type implements having means for applying a force thereto to cause the same to perform its function, it is desirable to have only the amount of force applied thereto that is necessary for the performance of the function. For example, in stapling implements, it is desirable to have only the amount of force necessary to cause the staples to penetrate the material and be clenched on the opposite side. Any excess of force causes undue strain on the force applying means and on the stapling implement, vibration in the apparatus and undue wear on the moving parts due to unnecessary movement. This results in shortened life of the apparatus and increased cost of maintenance.

Prior punch-type implements have been susceptible to damage of the implement if the working element thereof encountered undue resistance to movement since the force applying means had to travel through a predetermined stroke before the same would be de-activated.

The present invention was developed to obviate the aforementioned problems. The apparatus of the instant invention provides means for applying force to the working element of a punch-type implement and adjustable control means therefor which controls the amount of force applied to the working element by varying the de-activation of the force applying means in accordance with the desired force to be applied so that only the amount necessary to the performance of its function is applied thereto.

It is therefore an object of the present invention to provide novel apparatus including means for applying force to the working element of a punch-type implement in a direction to move the same into operative engagement with a material to be worked upon and control means for deactivating the force applying means upon the application of a predetermined force to the working element and for varying the deactivation in accordance with the force desired to be applied.

It is another object of the present invention to provide novel apparatus of the character last described including a force transmitting member mounted for movement in a direction to force the working element of a punch-type implement into operative contact with a material being worked upon, means operatively associated with the force transmitting member for applying force thereto, and control means operable upon the application of a predetermined amount of force to said force transmitting member by said force applying means for deactivating said force applying means and wherein the control means is adjustable for varying the deactivation of the force applying means in accordance with the force desired to be applied.

It is still another object of the present invention to provide apparatus of the character last described including yieldable means connecting the force applying means and the force transmitting member, said yieldable means being adapted to yield a predetermined distance upon the application of a predetermined force thereto by the force applying means, and said control means being operable upon the yielding of said yieldable means the predetermined distance for deactivating said force applying means.

Some of the objects of the invention having been stated, other objects will appear as the description proceeds when taken in connection with the accompanying drawings, in which—

Figure 1:
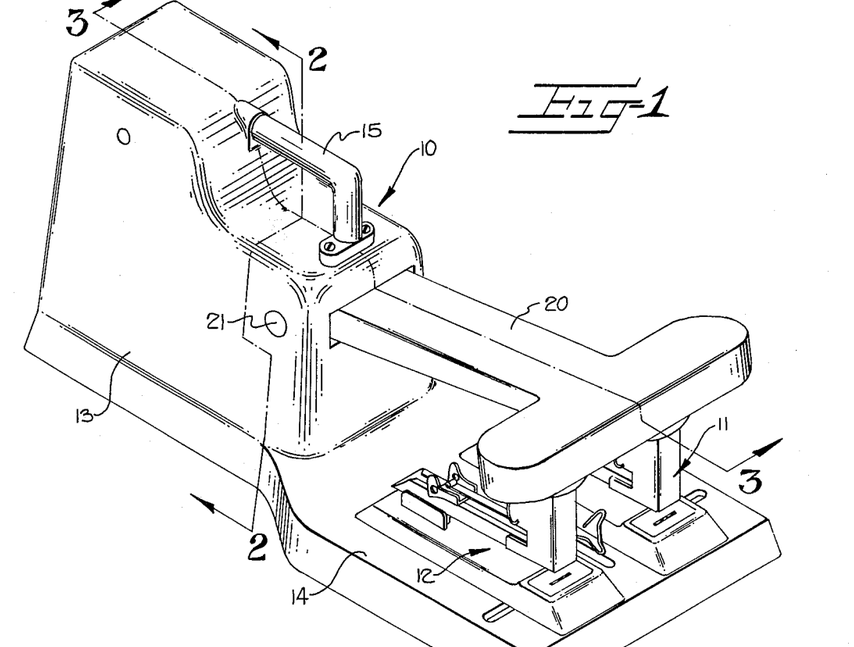
FIGURE 1 is an isometric view of the apparatus of the present invention associated with a pair of stapling implements.

Referring now to the drawings and more particularly to FIGURE 1, an apparatus 10 embodying the features of the present invention is shown associated with a pair of stapling machines or implements 11, 12. It is to be understood that the stapling machines or implements 11 and 12 are shown associated with the apparatus 10 for convenience of illustration and description only and are intended to be representative of the punch-type implements with which the apparatus 10 may be employed. It is contemplated that the apparatus 10 may be employed with equal success with any of a number of other punch-type implements such as punch-type can openers, embossing machines, rivet setting machines, etc.

Figure 2:
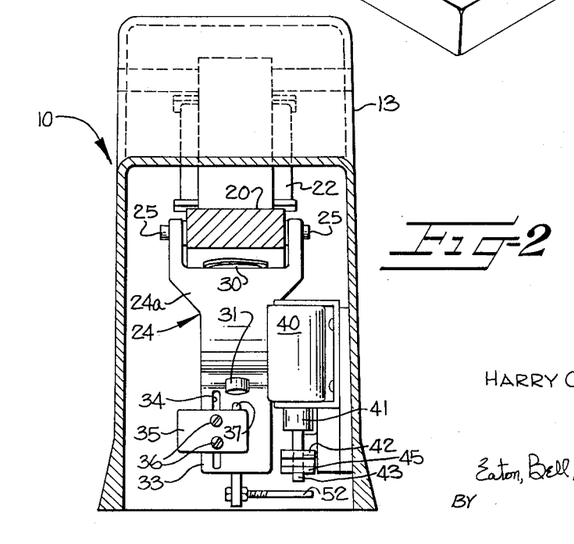
FIGURE 2 is a transverse vertical section taken substantially along line 2—2 of FIGURE 1.
Figure 3:
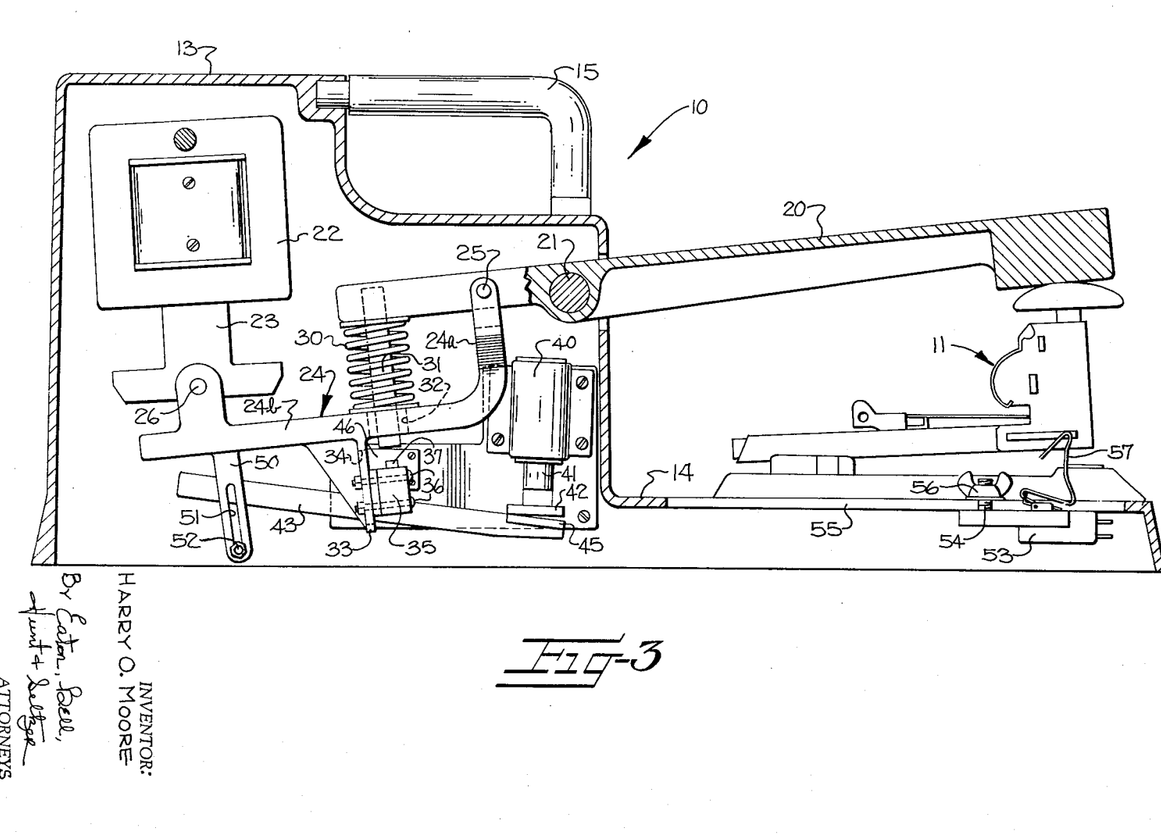
FIGURE 3 is a longitudinal vertical section taken substantially along line 3—3 of FIGURE 2.

Apparatus 10 comprises a housing 13 having a portion 14 extending outwardly therefrom which serves as a supporting member for the stapling implements 11 and 12. A handle 15 is mounted on housing 13 for use in transporting and manipulating the apparatus 10. A force transmitting member 20 is pivotally mounted on housing 13 intermediate its ends by a pivot pin 21 and has one end thereof extending outwardly from housing 13 to a position overlying portion 14 of housing 13. Member 20 is therefore positioned to immediately overly the working elements of the stapling implements 11, 12 when they are positioned on portion 14. It is noted that the working elements of stapling implements 11, 12 are upwardly biased by a spring (not shown) which is conventionally provided in implements of this type. It is to be understood that the particular structural configuration of force transmitting member 20 may be varied to correspond with the particular punch-type implement associated with apparatus 10. For example, the force transmitting member 20 could carry the working element of a punch-type can opener or the like.

A solenoid 22 is mounted within housing 13 and has a plunger 23 operatively associated therewith. A connecting member 24 is pivotally connected at one end to force transmitting member 20 by a pivot pin 25 and at the other end to plunger 23 of solenoid 22 by a pivot pin 26. Member 24 is generally L-shaped and off-set portion 24a is disposed vertically with a fork portion formed therein and disposed astraddle member 20. Pin 25 extends through both legs of the fork portion to pivotally connect the off-set portion 24a to member 20 such that part of the body portion 24b of member 24 underlies the end of member 20 on the opposite side of pivot 21 from the end overlying stapling implements 11, 12. A compression spring 30 is positioned between the portion of connecting member 24 underlying force transmitting member 20 and the bottom surface of force transmitting member 20. A pin 31 is mounted on force transmitting member 20 and extends downwardly through compression spring 30 and through a suitable opening 32 formed in the connecting member 24. Pin 31 is preferably of sufficient length to extend completely through connecting member 24 when the apparatus is in the inoperative position for reasons to be presently described.

Figure 4:
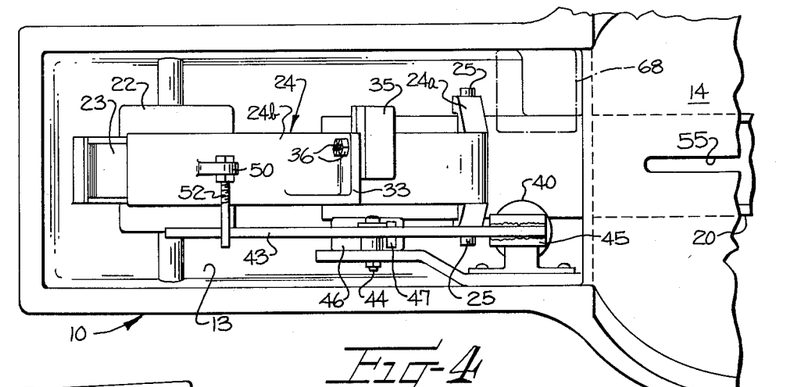
FIGURE 4 is a fragmentary bottom plan view of the left portion of the apparatus shown in FIGURE 3.

A bracket portion 33 extends downwardly from the medial portion of connecting member 24 and has an elongate slot 34 formed therein. A normally closed switch 35 is mounted for vertical adjustment on bracket member 33 by a pair of screw members 36 penetrating through slot 34 therein. Switch 35 has a plunger 37 extending upwardly therefrom and immediately underlying the lower end of pin 31 and is adapted to be opened by engagement of plunger 37 with the lower end of pin 31 when spring 30 is compressed a distance equal to the distance between plunger 37 and pin 31. The adjustable mounting of switch 35 allows the distance between plunger 37 and the lower end of pin 31 to be varied as desired. Since spring 30 has a predetermined and constant resistance to compression, the distance between plunger 37 and the lower end of pin 31 will control the amount of force which must be applied to spring 30 before switch 35 is opened, and will therefore serve as a means for varying the force applied to force transmitting member 20.

A control solenoid 40 is mounted within housing 13 and has a plunger 41 operatively associated therewith. A suitable permanent magnet 42 is mounted on the end of plunger 41 for reasons to be presently apparent. A switch actuating member 43 is pivotally mounted intermediate its ends on housing 13 by a pivot pin 44 and carries a second permanent magnet 45 at one end thereof immediately underlying the magnet 42. A switch 46 is mounted on the side of housing 13 and has a plunger 47 extending outwardly therefrom into a position overlying the portion of switch actuating member 43 between magnet 45 and pivot pin 44. Switch 46 is of the normally open type and is adapted to be closed by member 43 when the same pivots about its pivot point 44 into engagement with plunger 47. A bracket 50 is mounted on connecting member 24 and extends downwardly therefrom and has an elongated slot 51 formed therein. A pin 52 is mounted for vertical adjustment on bracket 50 by penetration thereof through slot 51 and extends outwardly from bracket 50 beneath the portion of switch actuating member 43 on the opposite side of pivot pin 44 from magnet 45.

A switch 53 is adjustably mounted on portion 14 of housing 13 by a suitable bolt 54 which penetrates through an elongate slot 55 formed in the housing portion 14 and a wing nut 56 threadably received thereon. Switch 53 has a suitable actuating element 57 extending upwardly therefrom to a height exceeding the height of the base portions of the stapling implements 11 and 12 such that any suitable material to be stapled will engage the actuating element 57 when the same is placed beneath the working elements of the implements and therefore will close switch 53.

Figure 5:
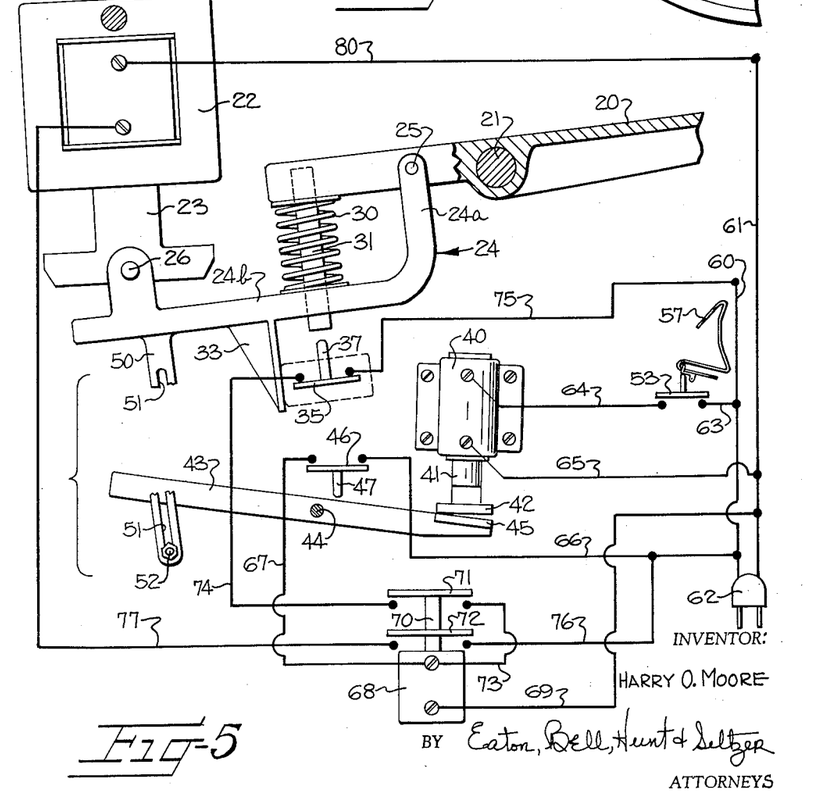
FIGURE 5 is a schematic view showing the electrical circuit for the apparatus shown in FIGURE 1.

Referring now to FIGURE 5, an electric circuit is provided for supplying electrical energy to solenoids 22 and 40 and comprises a power line 60 and a ground line 61 connected to a suitable male plug 62 which is adapted to be inserted in any suitable electrical outlet (not shown). Switch 53 is part of an energizing circuit for control solenoid 40 which comprises a line 63 connecting one side of switch 53 to power line 60, a line 64 connecting the other side of switch 53 to one side of solenoid 40 and a line 65 connecting the other side of solenoid 40 to ground line 61.

Switch 46 is part of a circuit for solenoid 22 which comprises an energizing circuit and a holding circuit. A line 66 connects one side of switch 46 to power line 60 and a line 67 connects the other side thereof to one side of a solenoid 68. The opposite side of solenoid 68 is connected to ground line 61 by a suitable line 69 to complete the circuit thereto. Solenoid 68 has a plunger 70 operatively associated therewith which carries movable elements of a pair of switches 71, 72 therewith. Switch 71 forms a part of the holding circuit for maintaining solenoid 68, and hence solenoid 22, energized after switch 46 is opened. This holding circuit comprises a line 73 connecting one side of switch 71 to the same side of solenoid 68 to which line 67 is connected, a line 74 connecting the other side of switch 71 to one side of switch 35 and a line 75 connecting the opposite side of switch 35 to power line 60.

Switch 72 forms a part of the energizing circuit for solenoid 22 which comprises a line 76 connecting one side of switch 72 to line 66 which, in turn, is connected to power line 60, a line 77 connecting the opposite side of switch 72 to one side of solenoid 22, and a line 80 connecting the opposite side of solenoid 22 to ground line 61.

Referring now to FIGURES 6 through 9 wherein another embodiment of the apparatus of the present invention is shown and wherein like reference characters are used to designate like parts with the prime notation added, the elements bearing the same reference characters with the prime notation added as elements previously described are substantially the same and function in substantially the same manner and therefore will not be described again in the description of this embodiment of the invention.

Figure 6:
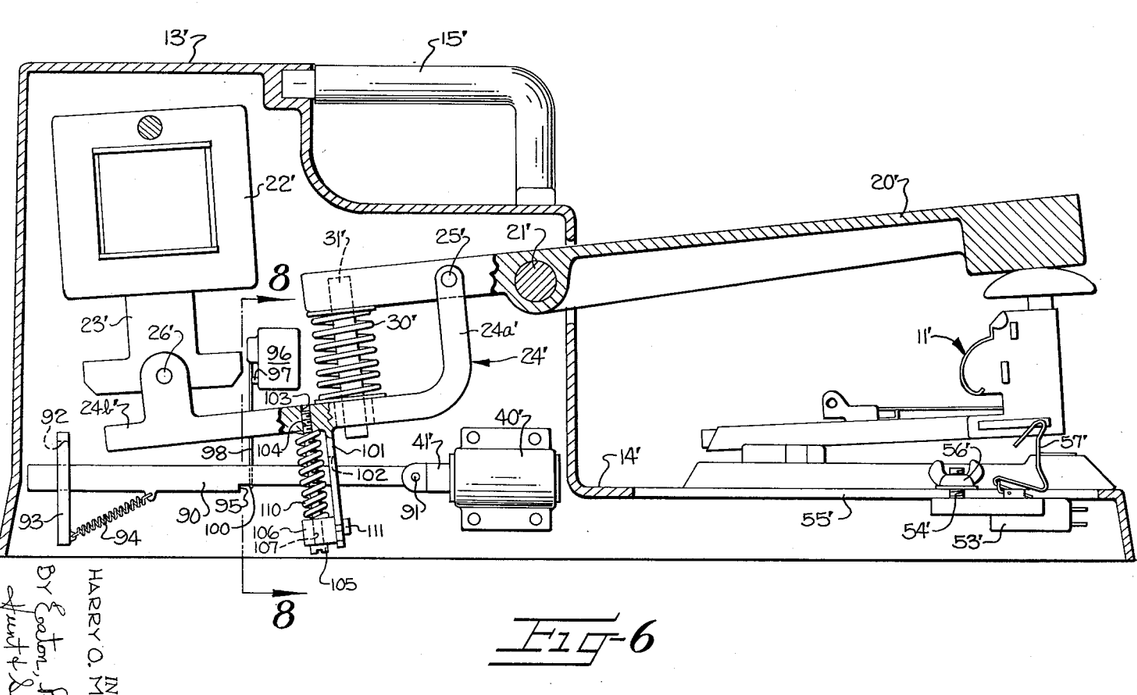
FIGURE 6 is a view similar to FIGURE 3 showing another embodiment of the apparatus of the present invention.

Turning now to a description of the distinguishing features of this embodiment over the one shown in FIGURES 1 through 5, a control member 90 is connected at one end by a pivot pin 91 to the plunger 41' of solenoid 40' and is mounted at its other end for sliding movement in a slot 92 in a bracket 93. Slot 92 is elongated in a vertical direction to allow member 90 to pivot upwardly about its pivot pin 91 for reasons to be presently described. A tension spring 94 is connected at one end to member 90 and at the other end to bracket 93 for biasing member 90 downwardly and to the left as seen in FIGURE 6 which is the retracted position thereof.

A shoulder 95 is formed on member 90 intermediate its ends for reasons to be presently described. A switch 96 is mounted on housing 13' and has a spring-loaded plunger 97 extending outwardly therefrom. A switch actuating member 98 is pivotally mounted at one end on switch 96 and extends downwardly therefrom to a point below member 90. Member 98 has an L-shaped or off-set portion 100 extending outwardly therefrom to a point immediately underlying the lower part of member 90 to the right of shoulder 95 as seen in FIGURE 6, and in the path of movement thereof as member 90 reciprocates or slidably moves to the right as seen in FIGURE 6 which is the extended position when solenoid 40' is energized. As member 90 moves to the extended position, shoulder 95 engages off-set portion 100 and thereby pivots member 98 about its pivot. The pivotal movement of member 98 causes the same to engage plunger 97 and thereby close switch 96.

Figures 7, 8, 9:
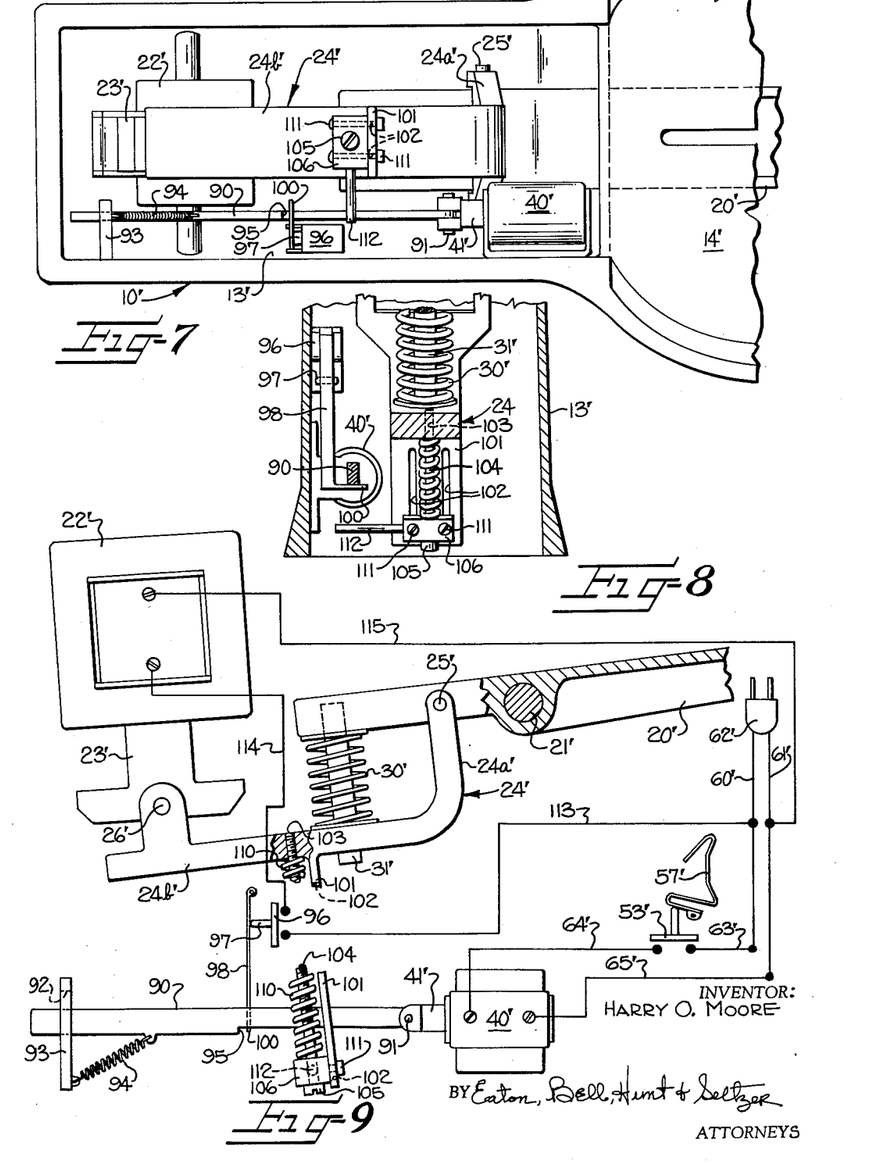
FIGURE 7 is a fragmentary bottom plan view similar to FIGURE 4 of the apparatus shown in FIGURE 6.
FIGURE 8 is a fragmentary section taken substantially along line 8—8 of FIGURE 6.
FIGURE 9 is a schematic view similar to FIGURE 5 showing the electrical circuit for the apparatus shown in FIGURE 6.

A bracket 101 is mounted on and extends downwardly from member 24' to a point below member 90. Bracket 101 has a pair of elongate slots 102 formed therein for reasons to be presently described. Member 24' has an internally threaded hole 103 formed therein adjacent bracket 101. A bolt member 104 having a head 105 at one end is threadably received for vertical adjustment in hole 103. A sliding block 106 is mounted on bolt member 104 by penetration thereof through a suitable hole 107 formed therein. A compression spring 110 is mounted on bolt member 104 between the top of block 106 and the bottom of member 24' and serves to bias the block 106 into engagement with the head 105 of bolt member 104. Block 106 is guided in its vertical adjustment by a pair of screws 111 mounted on block 106 and penetrating through slots 102 in bracket 101. A pin 112 is mounted on block 106 and extends outwardly therefrom to a point underlying member 90.

Referring now to FIGURE 9, switch 96 is part of the energizing circuit for solenoid 22' which comprises a line 113 connecting one side of switch 96 to power line 60', a line 114 connecting the other side thereof to one side of solenoid 22', and a line 115 connecting the other side of solenoid 22' to ground line 61'. Solenoid 40' has an energizing circuit substantially the same as solenoid 40 and is energized in the same manner.

In operation, a suitable material to be stapled is inserted between the working elements and base portions of the stapling machines 11 and 12 and engages the switch actuating member 57 thereby closing switch 53. The energizing circuit to control solenoid 40 is completed by the closure of switch 53 through lines 60, 64, 65 and 61 to thereby deliver electric current to energize the same which then retracts plunger 41 and thereby moves magnet 42 upwardly. Due to the attraction between magnets 42 and 45, member 43 is pivoted counter-clockwise, as seen in FIGURE 5, about its pivot 44 causing the end portion carrying magnet 45 to move into engagement with plunger 47 of switch 46 thereby closing the same. Switch 46 completes the energizing circuit to solenoid 68 which closes switches 71 and 72. Upon closure, switch 72 completes the energizing circuit to solenoid 22 which delivers electrical current thereto to energize the same. When closed, switch 71 completes the holding circuit to solenoid 68 and thereby maintains the same energized and switch 72 closed when switch 46 is opened.

Solenoid 22 retracts plunger 23 upon energization and thereby pivots member 24 clockwise, as seen in FIGURE 3, about its pivot 25 on force transmitting member 20. Member 24 is therefore moved upwardly and applies force to the lower end of compression spring 30. Compression spring 30 transmits the force applied thereto to the lower portion of force transmitting member 20 causing the same to pivot about its pivot 21 and engage the working elements of the stapling implements 11 and 12. Force transmitting member 20 continues its pivotal movement and thereby carries the working elements of staplers 11 and 12 into contact with the material being worked upon until they encounter resistance to their movement and thereby impart an increased resistance to the pivotal movement of force transmitting member 20. As this resistance to pivotal movement increases, compression spring 30 will be compressed thereby causing member 24 to move closer to force transmitting member 20 or relative to pin 31. Upon compression of spring 30 an amount equal to the distance between plunger 37 and the lower end of pin 31, plunger 37 of switch 35, which is carried by member 24, will be moved into contact with pin 31 thereby opening switch 35.

Prior to the opening of switch 35, pin 52, which is carried by bracket 50, is moved upwardly by the movement of member 25 into engagement with the lower side of member 43 on the opposite side of pivot pin 44 from magnet 45 and thereby causes member 43 to pivot in a clockwise direction as seen in FIGURE 3. This pivotal movement of member 43 moves the same out of engagement with plunger 47 of switch 46 and allows switch 46 to move to open position thereby breaking the circuit completed thereby to solenoid 68. However, solenoid 68 is maintained energized by the holding circuit completed through switches 71 and 35. It is therefore readily apparent that when switch 35 is opened by engagement of plunger 37 with the lower end of pin 31, the holding circuit to solenoid 68 will be broken and solenoid 68 will be de-energized. Upon de-energization, switches 71, 72 are opened thereby breaking the circuit to solenoid 22 and deenergizing the same. Plunger 23 of solenoid 22 is moved to the extended position by the resilient force of compression spring 30 applied to member 24 when solenoid 22 is de-energized. The apparatus has therefore completed one cycle of operation and is ready for another cycle of operation which will begin when other suitable material engages the switch actuating element 57.

It is noted that re-energization of solenoid 22 is prevented until switch 53 is opened by the removal of the stapled material from contact with actuating element 57 since control solenoid 40 is maintained energized until switch 53 is opened and therefore magnet 43 is maintained in its upper position by plunger 41. The maintenance of magnet 42 in its upper position maintains the same separated from magnet 45 a sufficient distance such that the attraction therebetween will not be sufficient to cause member 43 to pivot from the position to which it has been moved by pin 52. Once switch 53 is opened by removal of the stapled material, solenoid 40 is de-energized and magnet 42 and plunger 41 are moved downwardly by the force of gravity until magnet 42 moves into contact with magnet 45 or sufficiently close thereto such that the attraction therebetween will be sufficient to cause member 43 to pivot about pin 44 when solenoid 40 is re-energized.

The operation of the embodiment shown in FIGURES 6 through 9 is substantially the same as the operation of the embodiment shown in FIGURES 1 through 5, except that when solenoid 40' is energized by engagement of the material to be stapled with element 57' thereby closing switch 53', plunger 41' is retracted thereby moving shoulder 95 on member 90 into contact with off-set portion 100 of switch actuating member 98. Member 98 pivots into engagement with plunger 97 thereby closing switch 96 which completes the energizing circuit to solenoid 22'. When energized, solenoid 22' retracts plunger 23' thereby exerting a force on member 24'. Member 24' transfers the force to compression spring 30' which applies the force to transmitting member 20' causing the same to pivot about pin 21'. When resistance is encountered by force transmitting member 20', compression spring 30' is compressed and member 24' moves upwardly relative to force transmitting member 20'. When compression spring 30' has been compressed a predetermined amount equal to the distance between pin 112 and member 90, pin 112 mounted on sliding block 106 is moved into engagement with member 90 and moves the same upwardly relative to switch actuating member 98. The upward movement of member 90 moves shoulder 95 out of contact with off-set portion 100 of switch actuating member 98 and thereby allows the spring member in switch 96 (not shown) to move switch 96 to the open position. The opening of switch 96 breaks the circuit to solenoid 22' and thereby de-energizes the same.

It is noted that, as in the embodiment shown in FIGURES 1 through 5, re-energization of solenoid 22' is prevented until switch 53' is opened by the removal of the stapled material from contact with element 57' since member 90 is maintained in the extended position by solenoid 40'. The spring (not shown) in switch 96 moves switch actuating member 98 to the left, as seen in FIGURE 6, away from shoulder 95 when member 90 is pivoted upwardly by the upward movement of pin 112. It will be readily apparent that member 90 must be moved to the retracted position by spring 94 upon de-energization of solenoid 40' before shoulder 95 will be in position to again engage off-set portion 100 of switch actuating member 98.

It will therefore be apparent that a novel apparatus for applying force to a punch-type implement for causing the implement to perform its intended function upon a suitable material is provided which includes control means operable upon the application of a predetermined amount of force for rendering the apparatus inoperable.

In the drawings and specification there have been set forth preferred embodiments of the invention and, although specific terms are employed, they are used in a

I claim:

1. Apparatus for use with a punch-type implement having a working element movable into and out of engagement with a material to be worked upon, comprising a force transmitting member mounted for movement toward and away from the material and adapted to carry the working element of the punch-type implement therewith in its movement toward the material, means operatively connected to said force transmitting member for applying force thereto in a direction tending to move said member toward the material being worked upon, and control means operatively connected to said force applying means for varying the force applied thereby to said force transmitting member and operable upon the application of a predetermined amount of force to said force transmitting member by said force applying means for rendering said force applying means inoperative.

2. Apparatus for use with a punch-type implement having a working element movable into and out of engagement with a material to be worked upon, said apparatus comprising a force transmitting member mounted for pivotal movement, electrically operable means operatively connected to said force transmitting member for applying force thereto in a direction tending to move said member about its pivot, said force transmitting member being adapted to transmit the force from the force applying means to the working element of the punch-type implement for moving the same into engagement with the material to be worked upon, and control means for varying the force applied by said electrically operable means to said force transmitting member and including switch means connected to said electrically operable means operable upon the application of a predetermined amount of force to said force transmitting member by said electrically operable means for rendering said electrically operable means inoperative.

3. Apparatus for use with a punch-type implement having a working element movable into and out of engagement with a material to be worked upon, said apparatus comprising a force transmitting member mounted for pivotal movement, a solenoid mounted adjacent said force transmitting member and having a plunger operatively associated therewith for movement transversely of said force transmitting member when the solenoid is energized, yieldable means connecting said plunger to said force transmitting member for applying force from said solenoid to said force transmitting member in a direction tending to move the force transmitting member about its pivot, said yieldable means having the characteristic of yielding a predetermined distance upon the application of a predetermined amount of force to said force transmitting member, said force transmitting member being adapted to transfer the force applied thereto to the working element of the punch-type implement for moving the same into contact with the material to be worked upon, and control means operatively associated with said yieldable means and including switch means electrically connected to said solenoid, said control means being operable upon the yielding of said yieldable means the predetermined distance for rendering said solenoid inoperative.

4. Apparatus for use with a punch-type implement having a working element movable into and out of engagement with a material to be worked upon, said apparatus comprising a housing, a force transmitting member pivotally mounted on said housing, a solenoid mounted within said housing adjacent said force transmitting member and having a plunger operatively associated therewith and movable in a direction transversely of said force transmitting member, connecting means mounted on said plunger and extending outwardly therefrom and movable therewith toward said force transmitting member when said solenoid is energized, yieldable means positioned between said connecting means and said force transmitting member for applying force from said solenoid to said force transmitting member in a direction tending to move the force transmitting member about its pivot, said yieldable means having the characteristic of yielding a predetermined distance upon the application of a predetermined amount of force to said force transmitting member, said force transmitting member being adapted to transfer the force applied thereto to the working element of the punch-type implement for moving the same into contact with the material to be worked upon, and control means operatively associated with said yieldable means and including switch means electrically connected to said solenoid, said control means being operable upon the yielding of said yieldable means the predetermined distance for rendering said solenoid inoperative.

5. Apparatus for use with a punch-type implement having a working element movable into and out of engagement with a material to be worked upon, said apparatus comprising a housing, an elongate force transmitting member pivotally mounted on said housing intermediate its ends for pivotal movement relative thereto, a solenoid mounted within said housing adjacent said force transmitting member and having a plunger operatively associated therewith which is retracted in a direction transversely of the longitudinal axis of said force transmitting member when the solenoid is energized, connecting means mounted on the plunger of said solenoid and extending outwardly therefrom for movement therewith toward one end portion of said force transmitting member, yieldable means positioned between the connecting means and said one end portion of said force transmitting member for applying force to the force transmitting member when the plunger of the solenoid is retracted in a direction tending to move the force transmitting member about its pivot, said yieldable means having the characteristic of yielding a predetermined distance upon the application of a predetermined amount of force to said force transmitting member, said force transmitting member being adapted to have the other end portion thereof positioned for engagement with the working element and to transmit the force applied to said one end portion to the working element of the punch-type implement for moving the same into engagement with the material to be worked upon, and switch means carried by said connecting means and electrically connected to said solenoid and operable upon the yielding of said yieldable means the predetermined distance for de-energizing said solenoid.

6. Apparatus for use with a punch-type implement having a working element vertically movable into and out of engagement with a material to be worked upon, said apparatus comprising a housing, an elongate force transmitting member pivotally mounted on said housing intermediate its ends for pivotal movement about a horizontally disposed axis, a vertically disposed solenoid mounted within said housing adjacent one end portion of said force transmitting member and having a plunger operatively associated therewith which is retracted upwardly when the solenoid is energized, a connecting member mounted at one end on said plunger for movement therewith and extending outwardly therefrom to a position underlying said one end portion of said force transmitting member, yieldable means positioned between the connecting member and the force transmitting member for applying an upward force to said one end portion of the force transmitting member when the plunger of the solenoid is moved upwardly, said yieldable means having the characteristic of yielding a predetermined distance upon the application of a predetermined amount of force to said force transmitting member such that said connecting member moves closer to said force transmitting member, said force transmitting member being adapted to have the other end portion overlie the working element and to transmit the force applied to said one end portion of said force transmitting member to the working element of the punch-type implement for moving the same into engagement with the material to be worked upon, means carried by said force transmitting member and projecting therefrom toward said connecting member, switch means carried by said connecting member in opposing relation to said projecting means and being electrically connected to said solenoid, said switch means being adapted to engage said projecting means upon the yielding of said yieldable means the predetermined distance for actuation thereof to de-energize said solenoid.

7. The structure set forth in claim 6 wherein said yieldable means comprises a compression spring having opposite ends thereof in engagement with said one end portion of the force transmitting member and said connecting member, respectively, and having a predetermined resistance to compression which will be overcome by the application of a predetermined amount of force thereto causing the spring to yield a predetermined distance.

8. Apparatus for use with a punch-type implement having an upwardly biased working element movable downwardly into engagement with a material to be worked upon, said apparatus comprising an elongate force transmitting member pivotally mounted intermediate its ends and having one end portion adapted to overlie the working element of the punch-type implement, a vertically disposed solenoid mounted adjacent the other end portion of said force transmitting member and having a plunger operatively associated therewith for upward movement when the solenoid is energized, a connecting member mounted on said plunger for movement therewith and extending outwardly therefrom to a position underlying said other end portion of the force transmitting member, yieldable means positioned between the connecting member and said other end portion of the force transmitting member for applying an upward force to said other end portion when the solenoid is energized, said yieldable means having the characteristic of yielding a predetermined distance upon the application of a predetermined force to said other end portion, said force transmitting member being adapted to transmit the force applied to said other end portion of said force transmitting member to the working element of the punch-type implement for moving the working element into engagement with the material to be worked upon, a pin mounted on said force transmitting member and extending downwardly therefrom toward said connecting member, switch means mounted on said connecting member in position to underlie the lower end of said pin and being electrically connected to said solenoid, said switch means being adapted to engage said pin upon the yielding of said yieldable means the predetermined distance for de-energizing the solenoid, and means operatively connected to said solenoid and responsive to the positioning of material to be worked upon for energizing said solenoid.

9. Apparatus for use with a punch-type implement having an upwardly biased working element movable downwardly into engagement with a material to be worked upon, said apparatus comprising an elongate force transmitting member pivotally mounted intermediate its ends and having one end portion thereof adapted to overlie the working element of the punch-type implement, a vertically disposed solenoid mounted adjacent the other end portion of said force transmitting member and having a plunger operatively associated therewith for upward movement when the solenoid is energized, a connecting member mounted on said plunger for movement therewith and extending outwardly therefrom to a position underlying said other end portion of said force transmitting member, yieldable means positioned between the connecting member and said other end portion of the force transmitting member for applying an upward force to said other end portion when the solenoid is energized, said yieldable means having the characteristic of yielding a predetermined distance upon the application of a predetermined amount of force to said force transmitting member such that said connecting member moves closer to said other end portion of the force transmitting member, switch means operatively connected to said solenoid and operable when closed to energize said solenoid and when open to de-energize said solenoid, means responsive to the positioning of the material to be worked upon for closing said switch means and energizing said solenoid, and means carried by said connecting member for opening said switch means upon the yielding of said yieldable means the predetermined distance for de-energizing said solenoid.

10. In a stapling apparatus having a stapling implement provided with an upwardly biased working element mounted for vertical movement for positioning staples into a suitable material adapted to be disposed therebeneath; the combination of means for applying a predetermined force to said working element comprising an elongate force transmitting member mounted for pivotal movement and having one end portion thereof positioned to overlie the working element of the stapling implement for imparting downward movement thereto, means connected to said force transmitting member for applying a downward force to said end portion, and means for varying the force applied by said force applying means to said force transmitting member and to de-activate the force applying means upon a predetermined force being applied thereby to said force transmitting member.

11. In a stapling apparatus having a stapling implement provided with an upwardly biased working element mounted for vertical movement for positioning staples into a suitable material adapted to be disposed therebeneath; the combination of means for applying a predetermined force to said working element comprising an elongate force transmitting member pivotally mounted intermediate its ends and having one end portion thereof positioned to overlie the working element of the stapling implement for imparting downward movement thereto, a vertically disposed solenoid mounted adjacent the other end portion of said force transmitting member and having a plunger operatively associated therewith for upward movement when the solenoid is energized, a connecting member mounted on said plunger for movement therewith and extending outwardly therefrom to a position underlying said other end portion of said force transmitting member, yieldable means positioned between said connecting member and said other end portion of said force transmitting member for applying an upward force to said other end portion when said solenoid is energized, said yieldable means having the characteristic of yielding a predetermined distance upon the application of a predetermined amount of force to said force transmitting member, and control means operatively connected to said solenoid for energizing said solenoid upon the positioning of the material to be stapled beneath the working element and for de-energizing said solenoid upon the yielding of said yieldable means the predetermined distance.

12. The structure set forth in claim 11 wherein said control means comprises first switch means mounted adjacent the working element and having an actuating element extending into the path of any material disposed beneath the working element, a control solenoid electrically connected to said first switch means and having a retractable plunger operatively associated therewith, a switch actuating member carried by said plunger of the control solenoid and movable therewith upon retraction, second switch means operatively connected to said force applying solenoid and extending into the path of said switch actuating member for energizing said force applying solenoid, and third switch means mounted on said connecting member and operatively connected to said force applying solenoid for de-energizing the same upon the yielding of said yieldable means the predetermined distance.

13. The structure set forth in claim 12 wherein said third switch means is adjustably mounted on said connecting member so that the de-energization of the force applying solenoid may be varied in accordance with the desired force to be applied to said force transmitting member.

14. The structure set forth in claim 11 wherein said control means comprises first switch means mounted adjacent the working element and having an actuating element extending into the path of any material disposed beneath the working element, a control solenoid electrically connected to said first switch means and having a retractable plunger operatively associated therewith, a member carried by said plunger and movable therewith upon retraction, a second switch operatively connected to said force applying solenoid and having an actuating element extending into the path of said plunger carried member for energizing said force applying solenoid, and switch opening means mounted on said connecting member and engageable with said plunger carried member for moving said plunger carried member away from said second switch actuating element for opening said second switch and de-energizing said force applying solenoid upon the yielding of said yieldable means the predetermined distance.

15. The structure set forth in claim 14 wherein said switch opening means is adjustably mounted on said connecting member so that the de-energization of the force applying solenoid may be varied in accordance with the desired force to be applied to said force transmitting member.

References Cited in the file of this patent

UNITED STATES PATENTS 2,947,002    Moore _______________ Aug. 2, 1960